United States Patent
Schnaare et al.

(10) Patent No.: US 12,218,775 B2
(45) Date of Patent: Feb. 4, 2025

(54) ADVANCED PHYSICAL LAYER (APL) ADAPTER FOR LEGACY FIELD DEVICES

(71) Applicant: Rosemount Inc., Shakopee, MN (US)

(72) Inventors: Theodore Henry Schnaare, New Prague, MN (US); Eric Russell Lovegren, Monticello, MN (US); Yevgeny Yurevich Korolev, Maple Grove, MN (US); Robert Michael Weinberger, Prior Lake, MN (US); Marshall Leon Meier, Waconia, MN (US); Eric Darrell Rotvold, Mendota Heights, MN (US)

(73) Assignee: ROSEMOUNT INC., Shakopee, MN (US)

( * ) Notice: Subject to any disclaimer, the term of this patent is extended or adjusted under 35 U.S.C. 154(b) by 76 days.

(21) Appl. No.: 18/084,057

(22) Filed: Dec. 19, 2022

(65) Prior Publication Data
US 2024/0205041 A1    Jun. 20, 2024

(51) Int. Cl.
*H04B 1/38* (2015.01)
*H04L 5/16* (2006.01)
*H04L 12/28* (2006.01)

(52) U.S. Cl.
CPC ............................... *H04L 12/2801* (2013.01)

(58) Field of Classification Search
CPC ........... H04L 12/2801; H04L 12/40045; G06F 13/426; G06F 18/214; G06F 16/9537; G06K 19/07758
(Continued)

(56) References Cited

U.S. PATENT DOCUMENTS

| | | | |
|---|---|---|---|
| 1,860,904 | A | 5/1932 | Remington |
| 1,981,545 | A | 11/1934 | Hammerling |

(Continued)

FOREIGN PATENT DOCUMENTS

| | | | |
|---|---|---|---|
| CN | 1375110 A | 10/2002 | |
| CN | 1914701 A | 2/2007 | |

(Continued)

OTHER PUBLICATIONS

Notification of Transmittal of the International Search Report and the Written Opinion of the International Searching Authority from PCT/US2023/074338, dated Jan. 2, 2024.
(Continued)

*Primary Examiner* — Phuong Phu
(74) *Attorney, Agent, or Firm* — Westman, Champlin & Koehler, P.A.

(57) ABSTRACT

An Advanced Physical Layer (APL) adapter for enabling functional interconnection of a 2-wire APL spur to at least one industrial process legacy field device includes a first pair of terminals, APL physical layer (PHY) circuitry, a second pair of terminals and connectivity circuitry. The first pair of terminals is configured for connection to the 2-wire APL spur. The APL PHY circuitry is capacitively coupled to the first pair of terminals. The connectivity circuitry is configured to communicate with a legacy field device connected to the second pair of terminals in accordance with a legacy communication protocol and control the APL PHY circuitry to communicate through the first pair of terminals in accordance with an Ethernet protocol.

27 Claims, 7 Drawing Sheets

(58) Field of Classification Search
USPC .................. 375/219, 220, 222, 257, 258
See application file for complete search history.

(56) References Cited

U.S. PATENT DOCUMENTS

| | | |
|---|---|---|
| 2,855,579 A | 10/1958 | Wintriss |
| 2,955,352 A | 10/1960 | Wintriss |
| 3,696,364 A | 10/1972 | Lavelle |
| 3,706,957 A | 12/1972 | Iantorno |
| 3,737,609 A | 6/1973 | Overkott |
| 4,841,777 A | 6/1989 | Hershey et al. |
| 5,193,846 A | 3/1993 | Allard |
| 5,436,788 A | 7/1995 | Wallaert |
| 5,554,809 A | 9/1996 | Tobita et al. |
| 5,656,782 A | 8/1997 | Powell, II et al. |
| 5,798,910 A | 8/1998 | Holbeche et al. |
| 5,937,758 A | 8/1999 | Maracas et al. |
| 6,047,220 A | 4/2000 | Eryurek |
| 6,050,145 A | 4/2000 | Olson et al. |
| 6,382,448 B1 | 5/2002 | Yuhara et al. |
| 6,422,532 B1 | 7/2002 | Garner |
| 6,457,367 B1 | 10/2002 | Behm et al. |
| 6,487,912 B1 | 12/2002 | Behm et al. |
| 6,568,266 B1 | 5/2003 | Desa et al. |
| 6,813,132 B1 | 11/2004 | Mitlmeier et al. |
| 7,035,773 B2 | 4/2006 | Keyes, IV et al. |
| 7,447,612 B2 | 11/2008 | Keyes, IV et al. |
| 7,458,275 B2 | 12/2008 | Kleven et al. |
| 7,848,906 B2 | 12/2010 | Keyes, IV et al. |
| 7,956,738 B2 | 6/2011 | Karschnia et al. |
| 8,049,361 B2 | 11/2011 | Kielb et al. |
| 8,145,180 B2 | 3/2012 | Brown et al. |
| 8,160,535 B2 | 4/2012 | Kielb et al. |
| 8,299,938 B2 | 10/2012 | Hedtke |
| 8,334,788 B2 | 12/2012 | Hausler et al. |
| 8,355,234 B2 | 1/2013 | Nilman-Johansson et al. |
| 8,538,560 B2 | 9/2013 | Brown et al. |
| 8,538,732 B2 | 9/2013 | Keyes, IV et al. |
| 8,626,087 B2 | 1/2014 | Vanderaa |
| 8,694,060 B2 | 4/2014 | Vanderaa et al. |
| 8,776,608 B2 | 7/2014 | Hedtke et al. |
| 8,787,848 B2 | 7/2014 | Kielb et al. |
| 8,847,571 B2 | 9/2014 | Kielb |
| 8,929,948 B2 | 1/2015 | Vanderaa et al. |
| 9,089,049 B2 | 7/2015 | Perrault et al. |
| 9,117,609 B2 | 8/2015 | Kodama |
| 9,159,512 B2 | 10/2015 | Kodama et al. |
| 9,261,385 B2 | 2/2016 | Loeffel et al. |
| 9,473,050 B2 | 10/2016 | Park |
| 9,674,976 B2 | 6/2017 | Strei et al. |
| 9,971,316 B2 | 5/2018 | Jia et al. |
| 10,102,985 B1 | 10/2018 | Pelletier et al. |
| 10,217,573 B2 | 2/2019 | Glosser et al. |
| 10,701,820 B1 | 6/2020 | Jacobs et al. |
| 10,915,084 B2 | 2/2021 | Wienhold et al. |
| 11,513,018 B2 | 11/2022 | Holm et al. |
| 2002/0149371 A1 | 10/2002 | Grassmann |
| 2003/0085200 A1 | 5/2003 | Rosenkrans et al. |
| 2003/0171827 A1 | 9/2003 | Keyes, IV et al. |
| 2004/0047104 A1 | 3/2004 | Turner et al. |
| 2005/0168891 A1 | 8/2005 | Nilman-Johansson et al. |
| 2006/0142875 A1 | 6/2006 | Keyes, IV et al. |
| 2006/0274493 A1 | 12/2006 | Richardson et al. |
| 2008/0157235 A1 | 7/2008 | Rogers et al. |
| 2009/0062931 A1 | 3/2009 | Keyes, IV et al. |
| 2010/0181179 A1 | 7/2010 | Bou et al. |
| 2010/0258331 A1 | 10/2010 | Dahlgren et al. |
| 2011/0134973 A1 | 6/2011 | Keyes, IV et al. |
| 2012/0111596 A1 | 5/2012 | Mortun et al. |
| 2013/0335174 A1 | 12/2013 | Kodama et al. |
| 2014/0002945 A1 | 1/2014 | Kodama |
| 2015/0002753 A1 | 1/2015 | Perrault et al. |
| 2015/0115863 A1 | 4/2015 | Park |
| 2015/0155111 A1 | 6/2015 | Kondrus |
| 2015/0208538 A1 | 7/2015 | Clarke et al. |
| 2015/0369684 A1 | 12/2015 | Nguyen et al. |
| 2016/0069765 A1 | 3/2016 | Ishikawa et al. |
| 2016/0092386 A1* | 3/2016 | Sakamoto ............ G06F 13/426 710/106 |
| 2016/0109871 A1 | 4/2016 | Phillips |
| 2016/0377306 A1 | 12/2016 | Drees et al. |
| 2017/0178825 A1 | 6/2017 | Glosser et al. |
| 2018/0024195 A1 | 1/2018 | Takamura et al. |
| 2018/0070468 A1 | 3/2018 | Yanagisawa et al. |
| 2018/0275006 A1 | 9/2018 | Osawa et al. |
| 2018/0283972 A1 | 10/2018 | Osawa et al. |
| 2019/0029121 A1 | 1/2019 | Gaertner, II |
| 2019/0066938 A1 | 2/2019 | Ishida et al. |
| 2019/0138995 A1* | 5/2019 | Currin ................ G06F 16/9035 |
| 2019/0253544 A1 | 8/2019 | Hu et al. |
| 2019/0286965 A1* | 9/2019 | Lovell ............. G06K 19/07758 |
| 2020/0063884 A1 | 2/2020 | Hurd |
| 2020/0103386 A1 | 4/2020 | Lindsey et al. |
| 2020/0371572 A1* | 11/2020 | Plank ................ H04L 12/40045 |
| 2021/0081346 A1 | 3/2021 | Nixon et al. |
| 2021/0148778 A1 | 5/2021 | Stopel et al. |
| 2021/0157198 A1 | 5/2021 | Hu et al. |
| 2021/0226822 A1* | 7/2021 | Graber ................ G06F 18/214 |
| 2021/0356346 A1 | 11/2021 | Hidaka et al. |
| 2021/0360809 A1 | 11/2021 | Ahn et al. |
| 2022/0078252 A1 | 3/2022 | Nixon et al. |
| 2023/0324871 A1 | 10/2023 | Strütt et al. |
| 2024/0056320 A1 | 2/2024 | Swarr et al. |

FOREIGN PATENT DOCUMENTS

| | | |
|---|---|---|
| CN | 101718842 A | 6/2010 |
| CN | 102169162 A | 8/2011 |
| CN | 103443895 A | 12/2013 |
| CN | 104396138 A | 3/2015 |
| CN | 205533544 U | 8/2016 |
| CN | 106471595 A | 3/2017 |
| DE | 102020123409 A1 | 3/2022 |
| EP | 0 948 759 A1 | 10/1999 |
| EP | 2 063 278 A1 | 5/2009 |
| FR | 2167150 A5 | 8/1973 |
| GB | 1402740 A | 8/1975 |
| JP | H01-166425 A | 6/1989 |
| JP | H03-012808 A | 4/1992 |
| JP | H4-102127 | 4/1992 |
| JP | 2009-110546 A | 5/2009 |
| JP | 2012-199115 A | 10/2012 |
| WO | 2020120058 A1 | 6/2020 |
| WO | 2022182727 A1 | 9/2022 |
| WO | 2022182771 A1 | 9/2022 |
| WO | 2022182771 A4 | 10/2022 |

OTHER PUBLICATIONS

Communication Pursuant to Rules 161(1) and 162 EPC from European Patent Application No. 19705438.0, dated Oct. 20, 2020.
E-Direct Produktkatalog 2016-2017, Endress+Hauser, Part 1, Jan. 1, 2016, pp. 1-84.
E-Direct Produktkatalog 2016-2017, Endress+Hauser, Part 2, Jan. 1, 2016, pp. 85-168.
E-Direct Produktkatalog 2016-2017, Endress+Hauser, Part 3, Jan. 1, 2016, pp. 169-180.
Notification of Transmittal of the International Search Report and the Written Opinion of the International Searching Authority, from PCT/US2019/015556, dated Apr. 18, 2019.
Product Data Sheet, Rosemount 2120 Level Switch-Vibrating Fork, 00813-0100-04030, Rev. HC, Dec. 2017, 24 pgs.
U.S. Appl. No. 15/928,449, filed Mar. 22, 2018.
U.S. Patent Office issued prosecution for U.S. Appl. No. 15/918,226, filed Mar. 12, 2018, including: Corrected Notice of Allowability issued Dec. 1, 2020, 3 pages; Notice of Allowance and Fees Due (PTOL-85) issued Oct. 20, 2020, 8 pages; Final Rejection issued Jul. 28, 2020, 25 pages; Non-Final Rejection issued Mar. 4, 2020, 25 pages; Advisory Action, Examiner Initiated Interview Summary and AFCP Decision issued Nov. 29, 2019, 5 pages; Final Rejection issued Sep. 23, 2019, 24 pages; Non-Final Rejection issued May 16, 2019, 23.

(56) References Cited

OTHER PUBLICATIONS

First Office Action, including Search Report, for Chinese Patent Application No. 201810667210.4, dated May 5, 2022, 13 pages.
Second Office Action, including Search Report, for Chinese Patent Application No. 201810667210.4, dated Aug. 26, 2022, 5 pages.
Communication Pursuant to Article 94(3) EPC from European Patent Application No. 19705438.0, dated Oct. 22, 2021.
Notice of Reasons for Rejection (Office Action) from Japanese Patent Application No. 2020-548912, dated Nov. 11, 2021.
Notification of Transmittal of the International Search Report and the Written Opinion of the International Searching Authority, from PCT/US2021/033067, dated Sep. 9, 2021.
U.S. Patent Office issued prosecution for U.S. Appl. No. 17/039,222, filed Sep. 30, 2020, including: Notice of Allowance and Fees Due (PTOL-85) and Examiner Initiated Interview Summary issued Jul. 25, 2022, 9 pages; Non-Final Rejection issued Apr. 8, 2022, 17 pages; 26 pages total.
U.S. Appl. No. 18/084,068, filed Dec. 19, 2022.
Notification of Transmittal of the International Search Report and the Written Opinion of the International Searching Authority from PCT/US2023/083050, dated Mar. 26, 2024.

* cited by examiner

ADVANCED PHYSICAL LAYER (APL) ADAPTER FOR LEGACY FIELD DEVICES

FIELD

Embodiments of the present disclosure relate to industrial process control systems and field devices of such systems. More specifically, embodiments of the present disclosure relate to techniques for adapting legacy field devices for Ethernet communications in Advanced Physical Layer (APL) (Ethernet-APL) systems.

BACKGROUND

In industrial settings, control systems are used to monitor and control inventories of industrial and chemical processes, and the like, using process measurement or control field devices. Such field devices may perform conventional field device tasks such as process parameter monitoring and measurements using one or more sensors (e.g., pressure sensor, level sensor, temperature sensor, etc.), and/or process control operations using one or more control devices (e.g., actuators, valves, etc.).

Ethernet-APL systems have been developed to improve field device data communications and safety. Such systems are responsible for the transmission and reception of data between a device (e.g., network interface controller, Ethernet hub, network switch, etc.) and a physical data communication link (e.g., data transmission cable). Ethernet-APL systems follow standards set by the Institute of Electrical and Electronics Engineers (IEEE) and the International Electrotechnical Commission (IEC), which allow for high speed data communications and the delivery of power and communications signals over a 2-wire connection while meeting certain intrinsic safety requirements.

Legacy field devices, which preceded the development of Ethernet-APL, but remain in wide use, typically utilize a 4-20 milliamp (mA) process control loop for power and data communications with a remotely located control unit. Such devices implement non-Ethernet legacy communication protocols, such as HART®, Modbus, PROFIBUS, Foundation™ Fieldbus, IO-Link, and others, some of which are more than 300 times slower than communications in Ethernet-APL systems.

Unfortunately, legacy field devices are not currently compatible with Ethernet-APL. Additionally, there may be a delay before new field devices having APL connectivity are developed to duplicate the full breadth of operation of current legacy field devices.

SUMMARY

Embodiments of the present disclosure relate to an Advanced Physical Layer (APL) adapter for enabling functional interconnection of a 2-wire APL spur to at least one industrial process legacy field device, and systems utilizing the adapter. One embodiment of the adapter includes a first pair of terminals, physical layer (PHY) circuitry, a second pair of terminals and connectivity circuitry. The first pair of terminals is configured for connection to the 2-wire APL spur. The PHY circuitry is capacitively coupled to the first pair of terminals. The connectivity circuitry is configured to communicate with a legacy field device connected to the second pair of terminals in accordance with a legacy communication protocol and control the PHY circuitry to communicate through the first pair of terminals in accordance with an Ethernet protocol.

One embodiment of the system enables functional interconnection of a 2-wire APL spur to at least one industrial process legacy field device. The system includes at least one industrial process legacy field device, and an adapter. The adapter includes a first pair of terminals, physical layer (PHY) circuitry, a second pair of terminals and connectivity circuitry. The first pair of terminals is configured for connection to the 2-wire APL spur. The PHY circuitry is capacitively coupled to the first pair of terminals. The legacy field device is connected to the second pair of terminals. The connectivity circuitry is configured to communicate with the legacy field device in accordance with a legacy communication protocol and control the PHY circuitry to communicate through the first pair of terminals in accordance with an Ethernet protocol.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION OF ILLUSTRATIVE EMBODIMENTS

Embodiments of the present disclosure are described more fully hereinafter with reference to the accompanying drawings. Elements that are identified using the same or similar reference characters refer to the same or similar elements. The various embodiments of the present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art.

Figure 1:
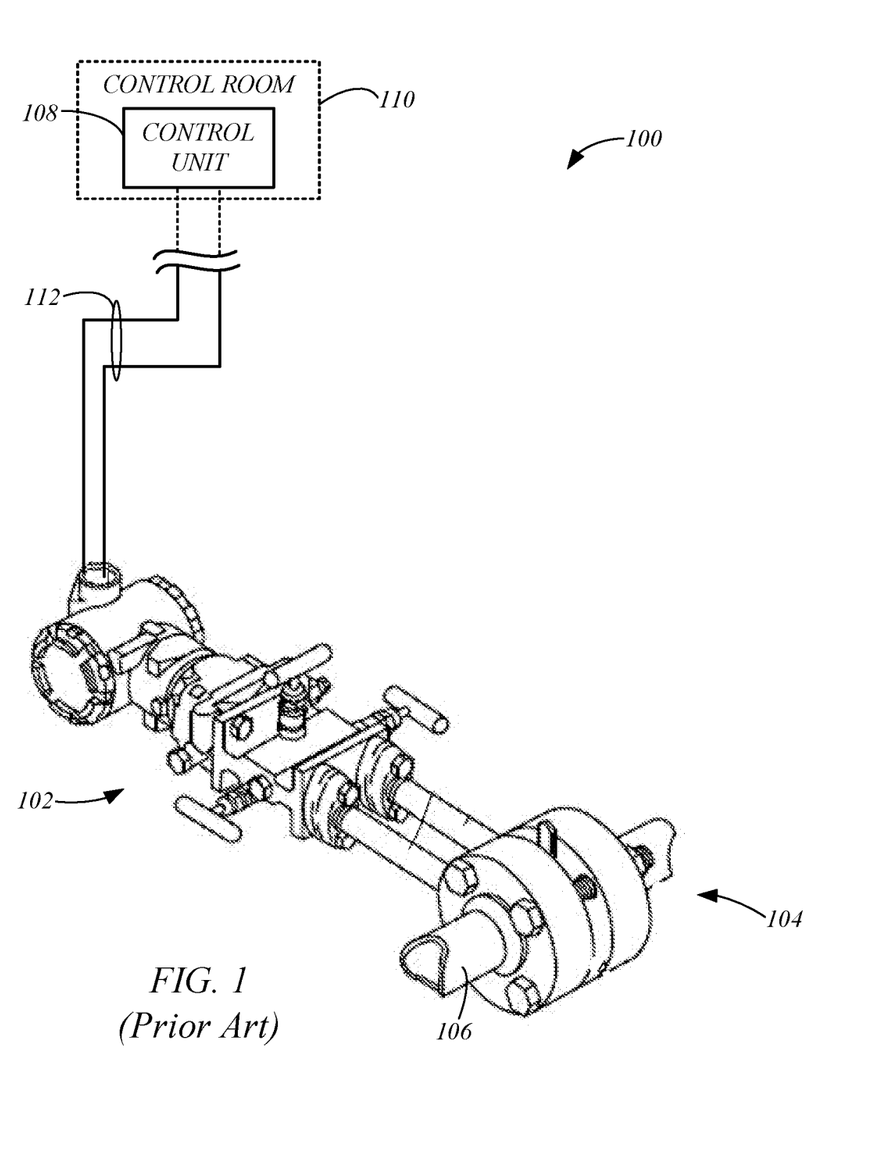
FIGS. 1 and 2 are simplified diagrams of examples of a process measurement or control system that includes an industrial process legacy field device, in accordance with the prior art.
Figure 2:
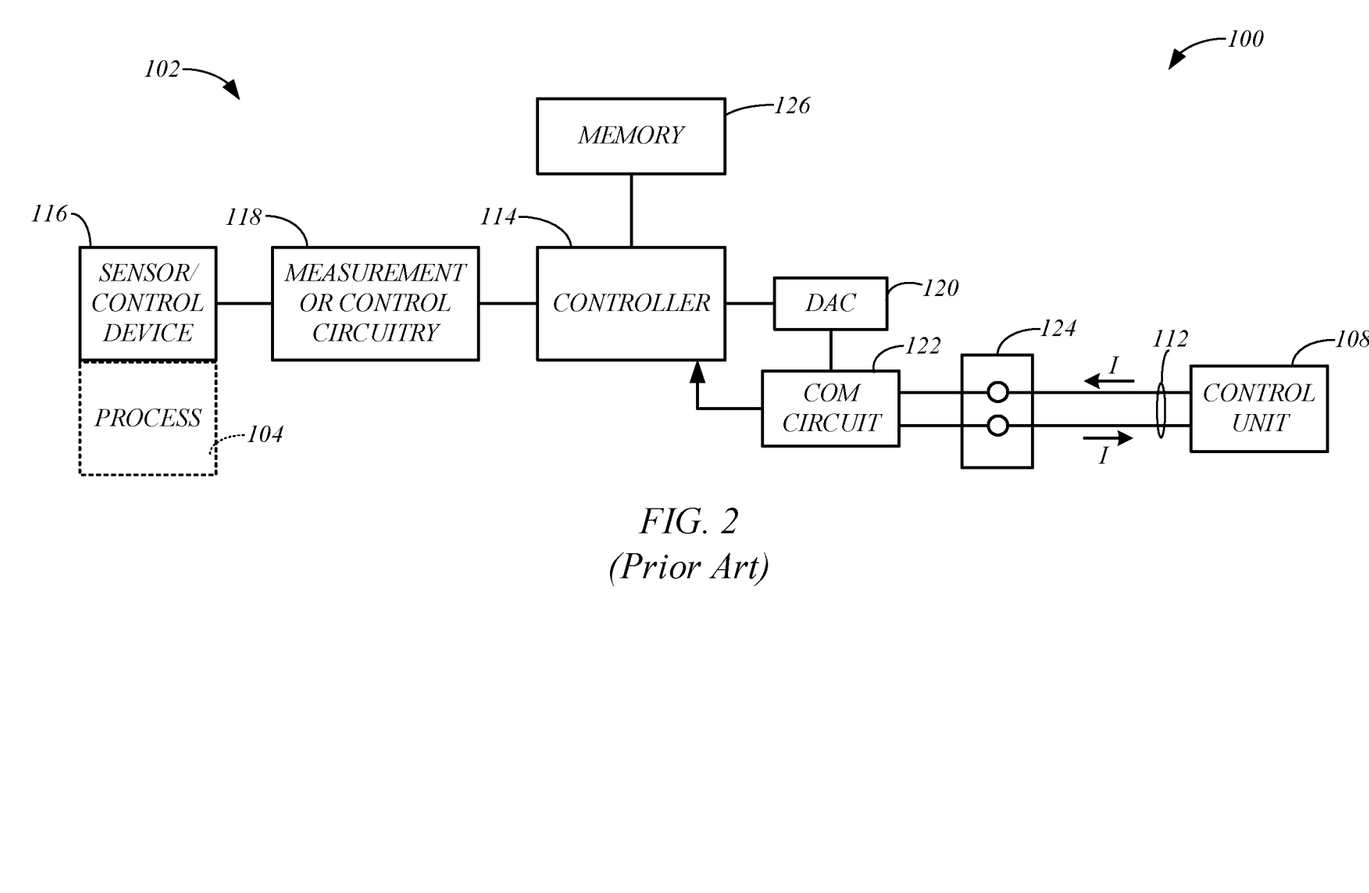

FIGS. 1 and 2 are simplified diagrams of an example of a process measurement or control system 100 that includes an industrial process legacy field device 102, in accordance with the prior art. The field device 102 may interact with an industrial process 104. In some embodiments, the process 104 involves a material, such as a fluid, transported through pipes, such as pipe 106 (FIG. 1), and/or contained in tanks, for example. The system 100 may perform processes that transform the material from a less valuable state into more valuable and useful products, such as petroleum, chemicals, paper, food, etc. For example, an oil refinery performs industrial processes that can process crude oil into gasoline, fuel oil, and other petrochemicals.

The field device 102 communicates with a computerized control unit 108 that controls the field device 102. The control unit 108 may be remotely located from the field device 102, such as in a control room 110 for the system 100, as shown in FIG. 1.

The field device 102 may be coupled to the control unit 108 over a process control loop 112, such as a 2-wire 4-20 milliamp (mA) process control loop, which may power the field device 102. Additionally, communications between the control unit 108 and the field device 102 may be performed over the control loop 112 in accordance with analog and/or digital communication protocols used by legacy field devices 102. For example, a process variable may be represented by an analog signal, such as a level of a loop current I (FIG. 2) flowing through the process control loop 112. Legacy digital communication protocols, such as the HART® communication standard, generally modulate digital signals onto the analog current level of the 2-wire process control loop 112. Other examples legacy digital communication protocols that may be used include Modbus, PROFIBUS, Foundation™ Fieldbus, IO-Link, and other communication protocols. These communication protocols used by legacy field devices 102 do not include Ethernet communication protocols.

In some embodiments, the field device 102 includes a controller 114, an active component in the form of one or more sensors or control devices 116, measurement or control circuitry 118, a digital-to-analog converter (DAC) 120, a communications circuit 122, and/or a terminal block 124, as shown in the simplified diagram of FIG. 2. The controller 114 may represent one or more processors (i.e., microprocessor, central processing unit, etc.) that control components of the field device 102 to perform one or more functions described herein in response to the execution of instructions, which may be stored locally in non-transitory, patent subject matter eligible, computer readable media or memory 126 of the device 102. In some embodiments, the processors of the controller 114 are components of one or more computer-based systems. In some embodiments, the controller 114 includes one or more control circuits, microprocessor-based systems, one or more programmable hardware components, such as a field programmable gate array (FPGA), that are used to control components of the device 102 to perform one or more functions described herein. The controller 114 may also represent other conventional legacy field device circuitry.

The field device 102 may be used to sense or measure a parameter of the process 104, such as a temperature, a level, a pressure, a flow rate, or another parameter of the process 104 using one or more sensors represented by block 116 in FIG. 2. Exemplary sensors 116 include pressure sensors, temperature sensors, level sensors, flow rate sensors, and/or other sensors used to sense or measure a process parameter.

The field device 102 may also be configured to control an aspect of the process 104 using one or more control devices represented by block 116 in FIG. 2. Exemplary control devices 116 include actuators, solenoids, valves, and other conventional process control devices used in field devices to control a process.

The measurement or control circuitry 118 represents circuitry that interacts with the sensor or the control device 116. For instance, the circuitry 118 may include measurement circuitry that translates an output from a sensor 116 for use by the controller 114 of the field device 102. The DAC 120 may be used by the controller 114 to convert digital signals into analog signals that are communicated to the control unit 108 using the communications circuit 122, such as over the 2-wire process control loop 112 by adjusting the loop current I to indicate a value of a process parameter sensed by the sensor 116, for example. The circuitry 118 may also be used to control a control device 116, such as in response to commands from the control unit 108 that are received by the controller 114 through the communications circuit 122, for example.

As mentioned above, legacy field devices 102 are not configured to communicate using Ethernet communication protocols. However, such communications will be available with the implementation of Ethernet-APL in the next generation of industrial process measurement and control systems and field devices. This will provide significant improvements over their legacy counterparts by providing high power and high data communication bandwidth over 2-wire links while satisfying intrinsic safety requirements.

Embodiments of the present disclosure are generally directed to the adaptation of legacy field devices 102 to operate in Ethernet-APL systems and take advantage of the benefits such systems offer. Thus, embodiments of the present disclosure allow process control and measurement systems to be updated to Ethernet-APL while utilizing existing legacy field devices 102, for which counterpart field devices configured for Ethernet-APL systems may not be available, for example.

Figure 3:
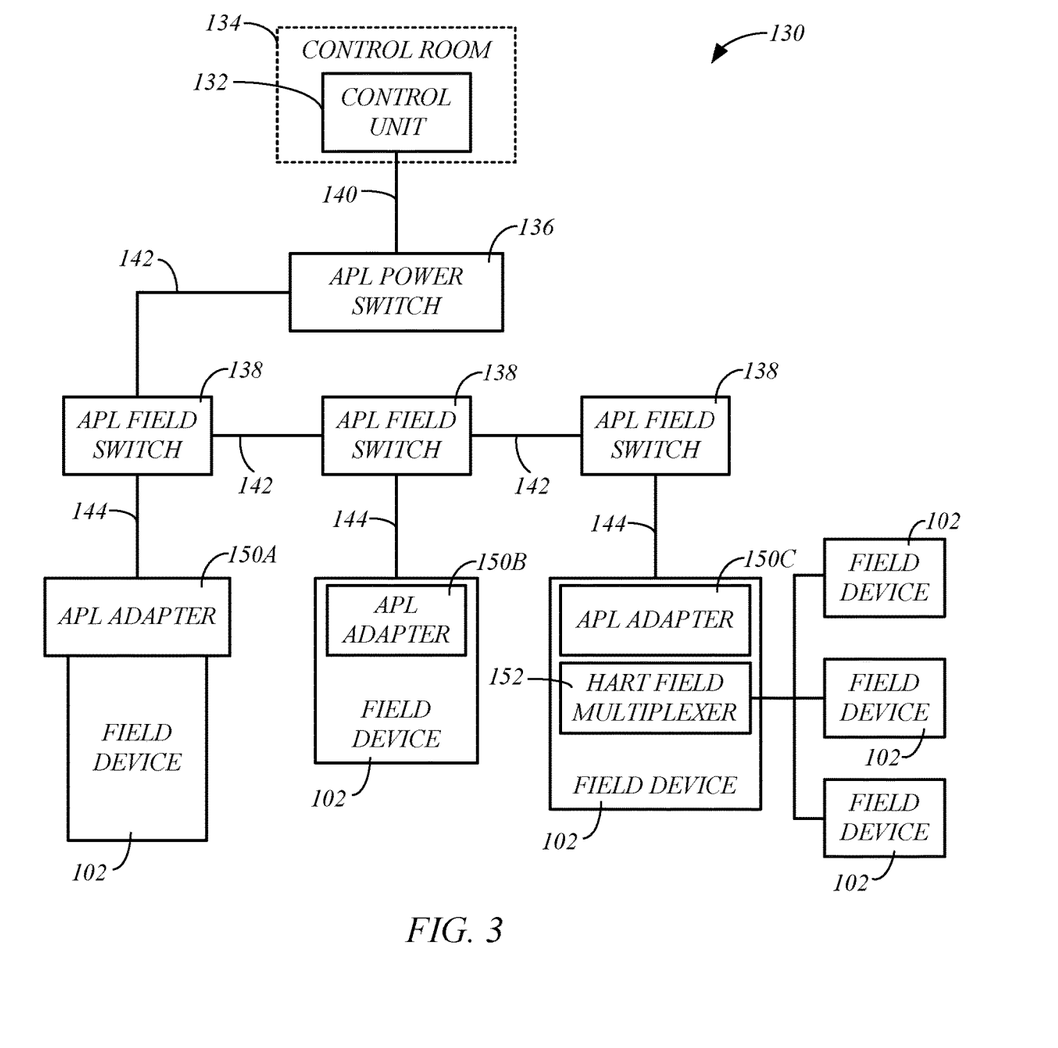
FIG. 3 is a simplified block diagram of an example of a process control or measurement system, in accordance with embodiments of the present disclosure.

FIG. 3 is a simplified block diagram of an example of a process control or measurement system 130, in accordance with embodiments of the present disclosure. The system 130 includes a control unit or host 132, which may take the form of the legacy control unit 108 described above and may be located in a control room 134. The system 130 also includes an APL power switch 136, and one or more APL field switches 138. The control unit 132 may be connected to the APL power switch 136 through Ethernet wiring (e.g., standard IEEE 802.3) 140. The APL power switch 136 handles data communications and powers the APL field switches 138 through an Ethernet-APL trunk (2-wire) 142. Each of the field switches 138 may provide data communication and power for one or more legacy field devices 102 over an APL spur (2-wire) 144. Each of the APL power switches 136, the APL trunks 142, the APL field switches 138, and the APL spurs 144 are formed in accordance with IEEE and IEC Ethernet-APL standards.

Embodiments of the present disclosure include an APL adapter 150 that adapts the power received over the spur 144 to power one or more legacy field devices 102 and facilitates communications using Ethernet-APL system standards between the control unit 132 and the legacy field devices 102, which utilize legacy industrial communication protocols (e.g., HART®, Modbus, PROFIBUS, Foundation™ Fieldbus, IO-Link, etc.). The adapter 150 may take on various forms. For example, the adapter 150 may take the form of an external adapter 150A that connects to the legacy field device 102, an adapter 150B that is incorporated into the legacy field device 102 (e.g., into the terminal block 124), a single adapter 150C that is connected to multiple legacy field devices 102, such as through a HART® field multiplexer 152 that facilitates a multidrop mode for the field devices 102, or another form.

Figure 4:
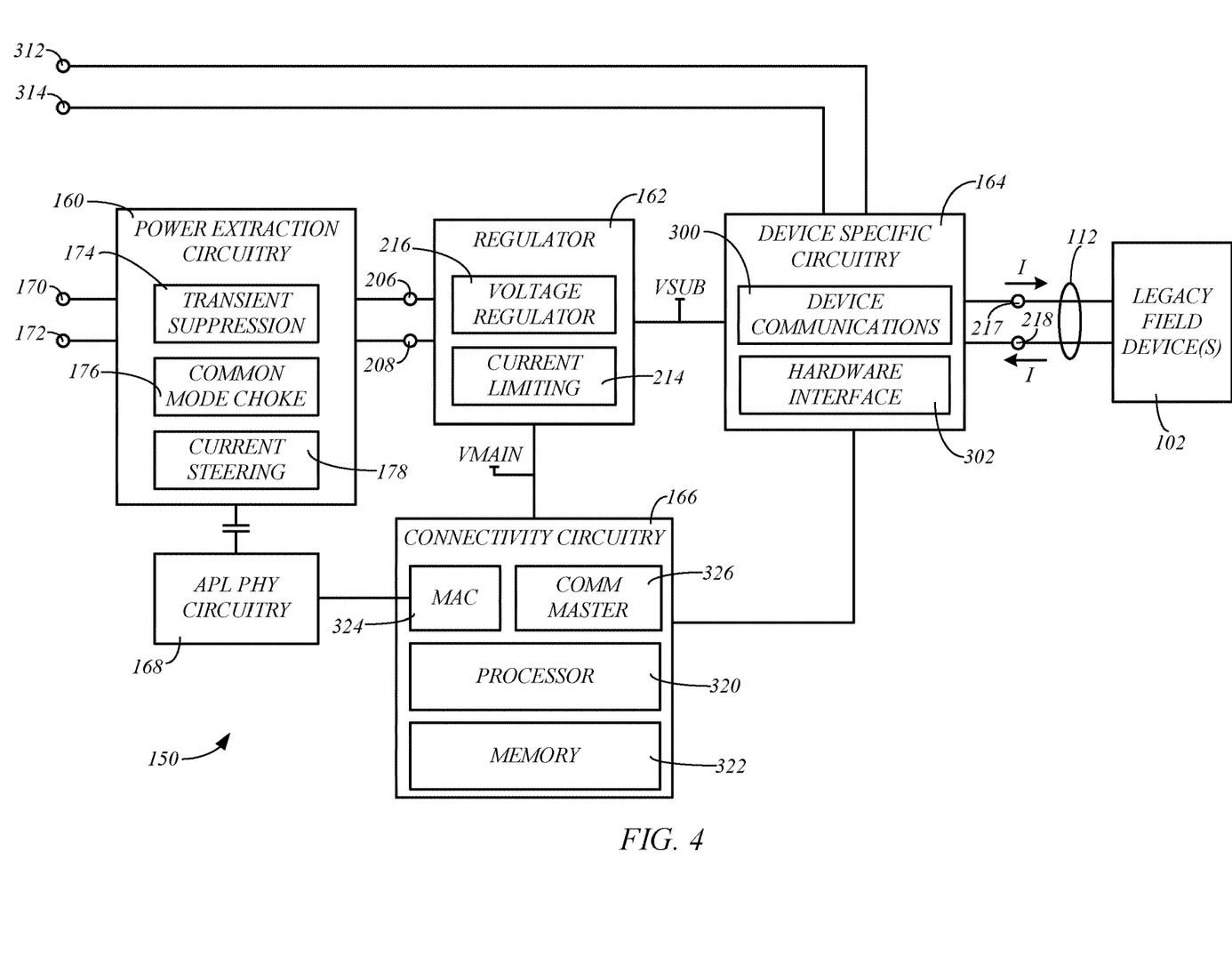
FIG. 4 is a simplified block diagram of an example of an adapter, in accordance with embodiments of the present disclosure.

FIG. 4 is a simplified block diagram of an example of an adapter 150, in accordance with embodiments of the present disclosure. In some embodiments, the adapter 150 includes power extraction circuitry 160, a regulator 162, device specific circuitry 164, connectivity circuitry 166 and/or APL physical layer (PHY) circuitry 168 (e.g., the ADIN1100 integrated circuit produced by Analog Devices).

The power extraction circuitry 160 includes a pair of terminals 170 and 172 that connect to the spur 144 extending from an APL field switch 138 (FIG. 3). The circuitry 160 generally operates to extract power from the spur power (e.g., minimum of 500 milliwatt (mW)) delivered over the spur 144 and received through the terminals 170 and 172. This extracted power is used to power the adapter 150 and the connected legacy field devices 102. Data may also be received and transmitted through the terminals 170 and 172 in accordance with Ethernet-APL standards.

The power extraction circuitry 160 may include transient suppression circuitry 174, a common mode choke (CMC) 176, and/or current steering circuitry 178. The transient suppression circuitry 174 operates to suppress voltage transients. The CMC 176 operates to suppress common mode voltage noise to a desired level. The current steering circuitry 178 directs the current of the extracted power along a desired circuit path, providing polarity insensitivity.

Figure 5:
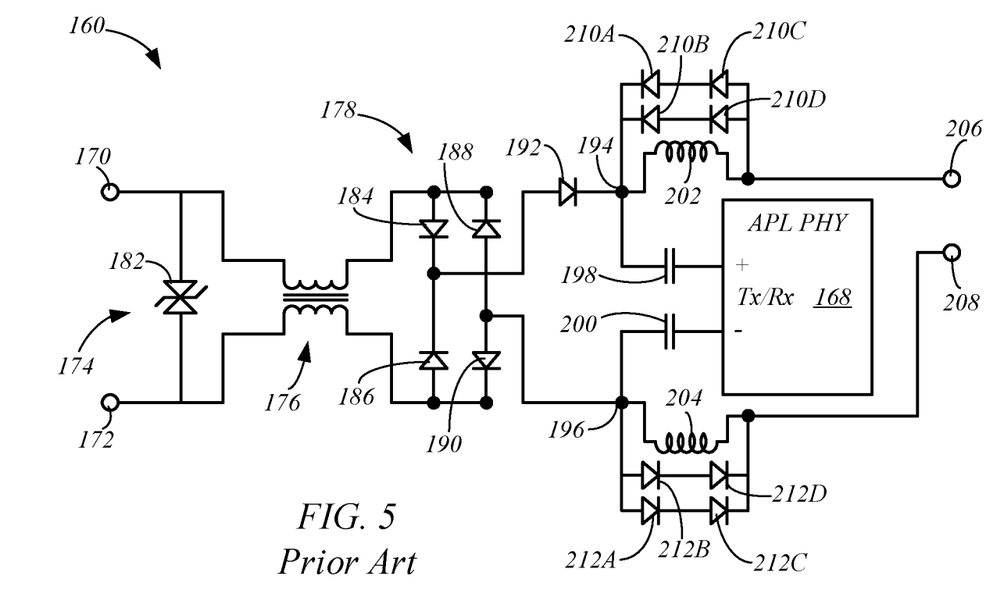
FIG. 5 is a circuit diagram of an example of power extraction circuitry along with an APL PHY circuitry, in accordance with the prior art.

FIG. 5 is a circuit diagram of an example of power extraction circuitry 160 along with an APL PHY circuitry 168 interface, in accordance with the prior art. In this example, the transient suppression circuitry 174 includes a transient voltage suppression diode 182 connected in parallel with the terminals 170/172. Other suitable techniques for suppressing voltage transients may also be used.

The CMC 176 may operate to reduce the common mode noise between the terminals 170 and 172 to a desired voltage level.

An example of the current steering circuitry 178 includes diodes 184, 186, 188 and 190 that route the current to flow through the diode 192. Other suitable current steering techniques may also be used. The current steering circuitry 178 and additional protection diode 192 prevent capacitance internal to the adaptor and legacy field device from appearing at the APL power load terminals 170 and 172 in accordance with intrinsic safety standards.

The transmitter pins (Tx) and the receiver pins (Rx) of the APL PHY circuitry 168 may be coupled to nodes 194 and 196 through capacitors 198 and 200 and suitable resistors, which allow the communication signals (e.g., 10BASE-T1L signals) to pass, while blocking direct current (DC) signals. The capacitors 198 and 200 may each represent two or more capacitors in series to meet intrinsic safety DC blocking requirements.

Inductors 202 and 204 connected between the nodes 194 and 196 and the terminals 206 and 208 operate to block communication signals (e.g., 10BASE-TIL signals) while passing through DC signals to extract power from the spur 144.

Diodes 210A-D and 212A-D, which are respectively connected in parallel with the inductors 202 and 204 operate to prevent inductive flyback and reduce the inductive ignition hazard in accordance with intrinsic safety standards.

The regulator 162 receives the extracted power from the power extraction circuitry 160 at the pair of terminals 206 and 208. In one example, the regulator 162 may include current limiting circuitry 214 that operates to ensure that the adapter 150 meets the 2-Wire Intrinsically Safe Ethernet (2-WISE) standard for operation in hazardous environments by limiting the current through the adapter 150 and/or current I through the legacy field device 102 to a level that is below a threshold maximum.

The regulator 162 may include a voltage regulator 216 that is generally configured to output a DC device voltage (VSUB), such as 12 VDC for supplying 48 mW (e.g., HART® field device configured for multidrop mode with fixed 4 mA in the loop, 4 mA at 12 VDC) for powering connected field devices 102 through a pair of terminals 217 and 218 (FIG. 4). The voltage regulator 216 may also be configured to output a DC main voltage (VMAIN) (e.g., 3.3 VDC) for powering circuitry of the adapter 150, such as the device specific circuitry 164, the connectivity circuitry 166, and/or the APL PHY circuitry 168, for example.

As mentioned above, the adapter 150 (150A) may be configured as an external device that is coupled to a legacy field device 102, or the adapter 150 (150B) may be integrated into the terminal block of the legacy field device 102, as shown in FIG. 1. When the adapter takes the form of adapter 150A, the terminals 217 and 218 are terminals of the terminal block 124 (FIG. 2), and when the adapter takes the form of adapter 150B, the terminals 170 and 172 are terminals of the terminal block 124.

Figure 6:
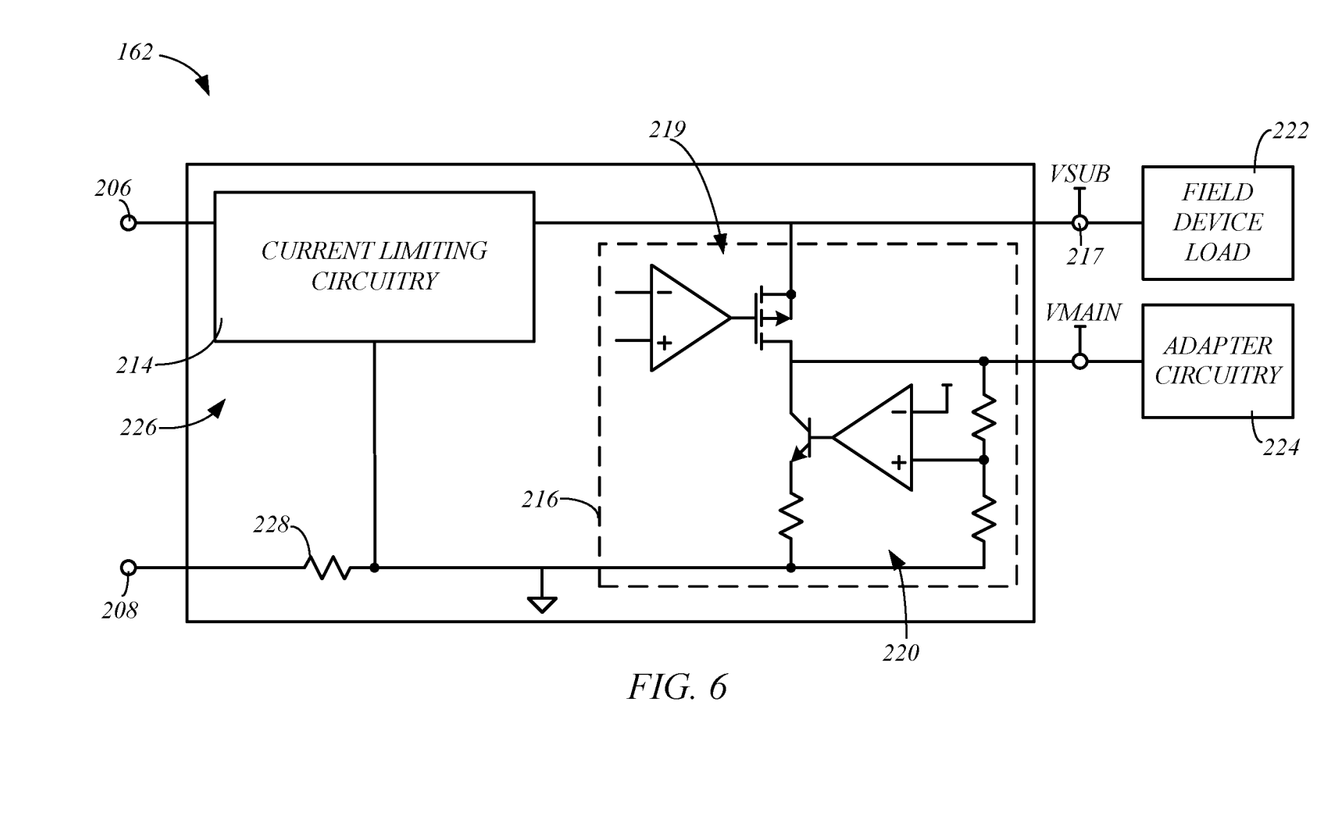
FIG. 6 is a simplified circuit diagram of an example of a regulator, in accordance with embodiments of the present disclosure.

FIG. 6 is a simplified circuit diagram of an example of the regulator 162, in accordance with embodiments of the present disclosure. In one embodiment, the voltage regulator 216 comprises dual voltage shunt regulators 219 and 220 with the voltage shunt regulator 219 providing the voltage source VSUB to the field device load 222 of the field devices 102 and the voltage shunt regulator 220 providing the voltage source VMAIN to circuitry 224 of the adapter 150. The voltage regulator 216 may take on other forms while extracting the desired VSUB and VMAIN DC voltages from the extracted power.

Referring back to FIG. 4, when necessary, the adapter 150 may include the device specific circuitry 164, which may include device communications circuitry 300 and/or hardware interface circuitry 302. The device communications circuitry 300 may be used to handle some forms of data communications (e.g., HART® data communications) between the adapter 150 and a connected legacy field device 102. The hardware interface circuitry 302 provides power and signal conditioning between the communications circuitry 300 and the connected legacy field device 102, such as an interface between the 4-20 mA loop 112 connected to the terminals 217 and 218 and the legacy field device 102 and the device communications circuitry 300, for example. These components may be considered as components of the regulator 216 and/or components of the connectivity circuitry 166.

Figure 7:
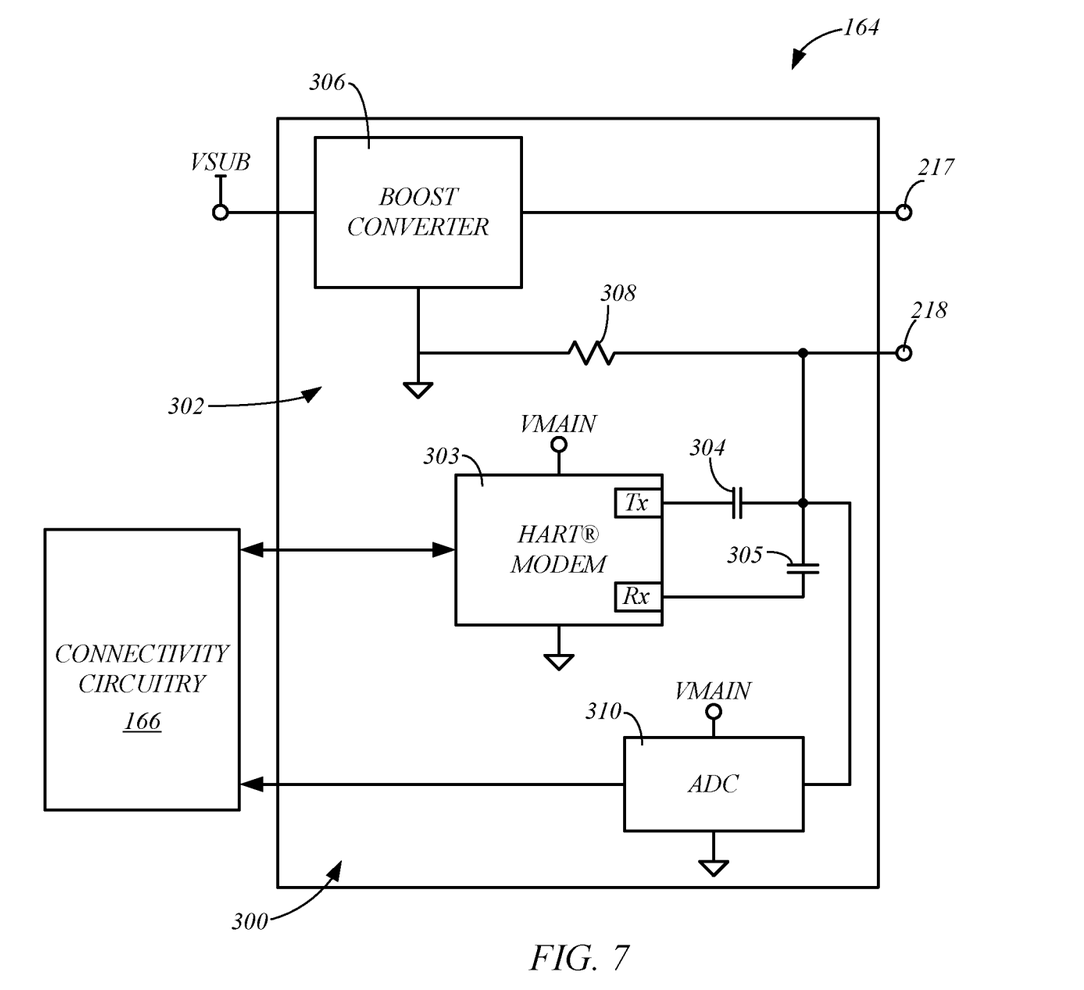
FIG. 7 is simplified circuit diagram of device specific circuitry, in accordance with embodiments of the present disclosure.

FIG. 7 is an example of the device specific circuitry 164 in accordance with embodiments of the present disclosure. The device communications circuitry 300 may include a HART® modem 303, or another type of data communication device (e.g., Foundation Fieldbus, etc.) whose transmitter and receiver ports (Tx and Rx) are capacitively coupled to the terminal 218 through capacitors 304 and 305, which block the 4-20 mA DC signal I (FIG. 4) while allowing the passage of high frequency data communications signals.

The hardware interface 302 may include a boost converter 306 configured to increase the voltage VSUB to ensure that the supply to the 4-20 mA loop meets the minimum operating specification (typically 12 VDC) of the connected legacy field device(s) 102 (e.g., HART® field device).

Accordingly, the device specific circuitry 164 may be configured to provide an analog signaling mode, in which the legacy field device 102 communicates information using the 4-20 mA current I, and/or a mixed signaling mode, in which data may be communicated using the 4-20 mA current I and digital communication signals (e.g., HART® Frequency Shift Key signals) that are superimposed over the 4-20 mA current I.

In the 4-20 mA current I and digital communication signal mode or 4-20 mA current I analog signaling mode, when the digital communications circuitry includes the HART® modem, the voltage VSUB (FIGS. 4 and 6) may be boosted to 17.3 VDC at the terminal 217 to account for the voltage drop across the minimum loop load resistor 308 (e.g., 230 Ohms) for HART® communications (e.g., 12 VDC+23 mA*230 Ohms). The device specific circuitry 164 may be adjusted to accommodate other digital communication protocols.

The hardware interface circuitry 302 may optionally include an analog-to-digital converter (ADC) 310 that operates to convert the analog 4-20 mA current I corresponding to the voltage at node 218 into a digital signal for processing/monitoring by the connectivity circuitry (FIG. 4). The ADC 310 may be considered as a component of the connectivity circuitry 166.

In some embodiments, the hardware interface 302 of the adapter 150 provides a HART® field multiplexor that accommodates a multidrop mode allowing for the connection of multiple legacy field devices 102 configured for HART® communications to the adapter 150, such as indicated by adapter 150C in FIG. 2. This effectively converts multiple legacy field devices 102 into APL devices without the need for replacing the instruments or extending additional cabling back to the corresponding field switch 138 (FIG. 3). For the multidrop configuration, the loop current I is substantially fixed, such as at 4 mA (+/−1 mA) at 12 VDC, to provide approximately 48 mW to power the connected legacy field devices 102.

In some embodiments, the device specific circuitry 164 includes terminals 312 and 314 that may be used to configure a connected legacy field device 102 and the adapter 150 (e.g., device communications circuitry 300, connectivity circuitry 166, APL PHY circuitry 168, etc.). In one example, the adapter 150 may be connected as a HART® device that is multidropped off the same HART® bus as the connected legacy field device(s) 102.

The connectivity circuitry 166 (FIG. 4) may include at least one processor 320 that is configured to perform one or more functions described herein in response to the execution of program instructions stored in memory 322. The at least one processor 320 may comprise components of computer-based systems, and may include control circuits, microprocessor-based control systems, and/or programmable hardware components, such as a field programmable gate array (FPGA). The memory 322 comprises any suitable patent subject matter eligible computer readable media that do not include transitory waves or signals. Examples of suitable forms of the memory include ferroelectric random access memory (FRAM), hard disks, CD-ROMs, optical storage devices, and/or magnetic storage devices. The connectivity circuitry 166 may include circuitry for use by the at least one processor 320 to receive and transmit data signals, such as in response to the execution of the instructions stored in the memory 322.

In some embodiments, the functions performed by the processor 320 of the connectivity circuitry 166 generally support the operation of the adapter 150 and the connected legacy field device(s) 102. For example, the connectivity circuitry 166 may operate to support media access control (MAC) 324 as well as other conventional transport and application layers needed for the Ethernet protocols that the APL PHY circuitry 168 and/or the legacy field device(s) 102 support (e.g., TCP, UDP, HTTP, EtherNet/IP, PROFINET, HART-IP, etc.). Accordingly, the connectivity circuitry 166 operates to facilitate Ethernet data communications between the control unit 132 (FIG. 3) or another connected control device (e.g., handheld unit) and the APL PHY circuitry 168, and between the APL PHY circuitry 168 and the connected legacy field device(s) 102.

In some embodiments, the connectivity circuitry 166 includes a communications client 326, which may represent software that is executable by the processor 320 and configured to handle a target communication protocol (e.g., HART®) of the connected legacy field devices 102. The communications client 326 may also be responsible for identifying and gathering relevant information about the connected legacy field devices 102. For example, the communications client 326 may operate to gather (e.g., through a poll-response or burst communications) data from each connected legacy field device 102 that is necessary to respond to upper-level requests (e.g., from the control unit 132 through the APL PHY circuitry 168) for static and dynamic instrument data. The gathered legacy field device data may be stored in the memory 322, and may include, for example, configuration, status, and dynamic variable data. The connectivity circuitry 166 may provide rapid responses to requests for the information from the control unit 132 or another control device through the APL PHY circuitry 168.

The connectivity circuitry 166 may be configured to store legacy field device specific information in the memory 322. Such information may include device specific commands for controlling aspects of the connected field devices 102, such as diagnostic features. Thus, the processor 320 may control the connected legacy devices 102 through the issuance of commands, and relay information, such as diagnostic information, to the control unit 132 or another control device.

When the adapter 150 is configured to provide the multidrop mode for connecting multiple legacy field devices 102 (FIG. 1), the connectivity circuitry 166 may cache information on each connected legacy field device 102 in the memory 322 and provide higher level host systems the ability to individually address each legacy field device 102.

Embodiments of the adapter 150 may also provide a Hypertext Transfer Protocol (HTTP) web interface, such as through the PHY circuitry 168 and/or connectivity circuitry 166, proxying for the connected legacy field devices 102 to facilitate configuring the adapter 150 and/or the connected legacy field devices 102. Thus, configuration, diagnostic, and other information relating to the connected legacy field devices may be accessible through the web interface of the adapter 150.

The connectivity circuitry 166 may also receive, translate, and/or forward writes and configuration changes directed by the control unit 132 or another control device to any connected legacy field device 102. The connectivity circuitry 166 may also translate acknowledgements received from the connected legacy field devices 102 and communicate the acknowledgements back to the control unit 132 via the APL PHY circuitry 168 using an Ethernet communication protocol.

The adapter 150 may provide diagnostic functions. In one embodiment, certain diagnostics may be performed when the adapter 150 is configured in the mixed signaling mode, in which both digital communications (e.g., HART®) and analog communications (e.g., 4-20 mA current I) are used. The mixed signaling mode allows for the monitoring of a value represented by the digital signal and the analog signal after it is converted by the ADC 310. These values may be made available through the interface of the APL PHY circuitry 168 and compared to each other to determine whether a fault condition exists with the connected legacy field device 102 and/or the adapter 150. For example, if the digital value of a process variable measured by the legacy field device 102 communicated via a digital communication protocol differs from the corresponding value represented by the current I of the loop 112 by a threshold amount, the control unit 132, adapter 150, or another control device may detect an abnormal condition in the legacy field device 102 or the adapter 150. Upon detection of such an abnormal condition a suitable notification or alarm may be triggered.

In some embodiments, the adapter 150 is configured to implement one or more security functions, such as a security function that prevents unauthorized access to any connected legacy field devices 102. Such security functions may be implemented by the processor 320 of the connectivity circuitry 166. For example, the connectivity circuitry 166 may be configured to implement basic firewall functionality that allows or prevents certain types of access to the connected legacy field devices 102, such as the prevention of configuration writes to the legacy field devices 102, to the memory 322, etc., while allowing for data reads. Such a firewall may also allow read/write access on a command-by-command or object-by-object basis providing highly granular security control based on a user's access rights. Thus, the adapter may be configured to allow different users or different user roles to have varying levels of access to the connected legacy field devices 102.

The adapter 150, such as through the connectivity circuitry 166, may be configured to host applications stored in the memory 322, such as, for example, applications for process parameter (e.g., flow, level, pressure, etc.) measurement compensation, discrete and analog control, user interfaces using the web user interface, and other field centered applications. Such applications could involve a single connected legacy field device 102 or multiple multidropped legacy field devices 102. For example, a flow or level control application implemented by the adapter 150 could be configured to utilize multiple process parameter measurement values (e.g., pressure and temperature) received from one or more connected legacy field devices 102 to calculate a compensated measurement (e.g., flow) or to control a control device (e.g., a valve).

In one embodiment, the adapter 150 includes an application that presents a virtual field device to the control unit 132 or another host system. The virtual field device may have its own address, data and/or parameter settings that can be read and controlled from a host application of the control unit 132, such as through a web interface implemented by the processor 320 of the connectivity circuitry 166. In one example, the virtual field device may be an aggregation of two or more connected legacy field devices 102.

The applications implemented by the adapter 150 may include user applications that implement a scripting language or a graphical programming tool. Such functionalities may be accessed via the adapter's web interface or a REST Application Program Interface (API) with aggregated and calculated values made available to host applications through the APL PHY circuitry 168 using standard Ethernet protocols.

Although the embodiments of the present disclosure have been described with reference to preferred embodiments, workers skilled in the art will recognize that changes may be made in form and detail without departing from the spirit and scope of the present disclosure.

What is claimed is:

1. An Advanced Physical Layer (APL) adapter for enabling functional interconnection of a 2-wire APL spur to at least one industrial process legacy field device, the adapter comprising:
   a first pair of terminals configured for connection to the 2-wire APL spur;
   APL physical layer (PHY) circuitry capacitively coupled to the first pair of terminals;
   a second pair of terminals;
   connectivity circuitry configured to communicate with a legacy field device connected to the second pair of terminals in accordance with a legacy communication protocol and control the APL PHY circuitry to communicate through the first pair of terminals in accordance with an Ethernet protocol; and
   wherein the connectivity circuitry is configured to receive, translate and/or forward writes and configuration changes to a connected legacy field device and communicate acknowledgements from the connected legacy field device to an external device via the APL PHY circuitry.

2. The APL adapter of claim 1, wherein the connectivity circuitry is configured to communicate data received through the first pair of terminals by the APL PHY circuitry through the second pair of terminals in accordance with the legacy communication protocol.

3. The APL adapter of claim 2, wherein the legacy communication protocol is selected from the group consisting of a current value in a 4-20 mA control loop, HART® communication protocol, Modbus communication protocol, PROFIBUS® communication protocol, Foundation™ Fieldbus communication protocol, and a IO-Link communication protocol.

4. The APL adapter of claim 1, further comprising:
   power extraction circuitry configured to output extracted power from spur power, which is received from the APL spur through the first pair of terminals; and
   a voltage regulator configured to output a device voltage using the extracted power, wherein the device voltage is used to power a legacy field device connected to the second pair of terminals.

5. The APL adapter of claim 4, wherein the voltage regulator is configured to output a main voltage, which is different from the device voltage and is configured to power the connectivity circuitry.

6. The APL adapter of claim 1, wherein the connectivity circuitry is configured to provide both analog communications using a 4-20 mA control loop and HART® communications through the second pair of terminals with a connected legacy field device.

7. The APL adapter of claim 6, wherein the adapter is configured to trigger an notification or an alarm when a value indicated by the 4-20 mA control loop differs from a value indicated through a HART® communication by a threshold amount.

8. The APL adapter of claim 4, wherein the connectivity circuitry is configured to provide HART® communications through the second pair of terminals, and the voltage regulator is configured to maintain a substantially constant current within a range of 4-20 mA through the second pair of terminals.

9. The APL adapter of claim 1, further comprising a HART® modem capacitively coupled to the second pair of terminals and configured to facilitate digital communications through the second pair of terminals in accordance with the HART® communication protocol.

10. The APL adapter of claim 1, wherein the connectivity circuitry is configured to communicate with individually addressed legacy field devices through the second pair of terminals, which are powered through the second pair of terminals.

11. The APL adapter of claim 1, wherein:
the connectivity circuitry comprises a processor; and
the adapter includes a non-transitory computer-readable medium comprising instructions stored thereon which, when executed by the processor, configure the connectivity circuitry to cache data communicated from at least one legacy field device connected to the second pair of terminals.

12. The APL adapter of claim 11, wherein the execution of the instructions by the processor configures the connectivity circuitry to implement a Hypertext Markup Language web user interface, through which a user may interrogate and/or configure the adapter and/or a legacy field device connected to the second pair of terminals.

13. The APL adapter of claim 11, wherein the execution of the instructions by the processor configures the connectivity circuitry to implement a security feature that restricts communication access to a legacy field device connected to the second pair of terminals.

14. The APL adapter of claim 11, wherein the execution of the instructions by the processor configures the connectivity circuitry to aggregate and/or analyze data received from one or more legacy field devices connected to the second pair of terminals.

15. A system for enabling functional interconnection of a 2-wire Advanced Physical Layer (APL) spur to at least one industrial process legacy field device, the system comprising:
at least one industrial process legacy field device; and
an adapter comprising:
a first pair of terminals configured for connection to the 2-wire APL spur;
APL physical layer (PHY) circuitry capacitively coupled to the first pair of terminals;
a second pair of terminals;
connectivity circuitry configured to control the APL PHY circuitry to communicate through the first pair of terminals in accordance with an Ethernet protocol, and communicate with the at least one legacy field device in accordance with a non-Ethernet legacy communication protocol through the second pair of terminals; and
wherein the connectivity circuitry is configured to communicate data received through the first pair of terminals by the APL PHY circuitry through the second pair of terminals in accordance with the legacy communication protocol;
the at least one legacy field device comprises a plurality of legacy field devices each connected to the second pair of terminals; and
the adapter comprises a HART® modem that is capacitively coupled to the second pair of terminals.

16. The system of claim 15, wherein the legacy communication protocol is selected from the group consisting of a current value in a 4-20 mA control loop, HART® communication protocol, Modbus communication protocol, PROFIBUS® communication protocol, Foundation™ Fieldbus communication protocol, and a IO-Link communication protocol.

17. The system of claim 15, wherein the APL adapter comprises:
power extraction circuitry configured to output extracted power from spur power, which is received from the APL spur through the first pair of terminals; and
a voltage regulator configured to output a device voltage using the extracted power, wherein the device voltage is used to power the at least one legacy field device connected to the second pair of terminals.

18. The system of claim 17, wherein the voltage regulator is configured to output a main voltage, which is different from the device voltage and is configured to power the connectivity circuitry.

19. The system of claim 15, wherein the connectivity circuitry is configured to provide both analog communications using a 4-20 mA control loop and digital communications through the second pair of terminals with the connected at least one legacy field device.

20. The system of claim 17, wherein:
the at least one legacy field device includes a plurality of legacy field devices;
the connectivity circuitry is configured to provide digital communications through the second pair of terminals; and
the voltage regulator is configured to maintain a substantially constant current within a range of 4-20 mA through the second pair of terminals.

21. The system of claim 15, wherein the connectivity circuitry is configured to receive, translate and/or forward writes and configuration changes to the at least one legacy field device and communicate acknowledgements from the at least one legacy field device to an external device via the APL PHY circuitry.

22. The system of claim 15, wherein:
the at least one legacy field device is configured to communicate through the second pair of terminals in accordance with the HART® communication protocol; and
the adapter includes a HART® modem capacitively coupled to the second pair of terminals and configured to communicate with the at least legacy field device in accordance with the HART® communication protocol.

23. The system of claim 15, wherein:
the at least one legacy field device comprises a single legacy field device having a terminal block; and
the second pair of terminals of the adapter are connected to terminals of the terminal block.

24. The system of claim 15, wherein the adapter is integrated into the terminal block of the legacy field device.

25. An Advanced Physical Layer (APL) adapter for enabling functional interconnection of a 2-wire APL spur to at least one industrial process legacy field device, the adapter comprising:
a first pair of terminals configured for connection to the 2-wire APL spur;
APL physical layer (PHY) circuitry capacitively coupled to the first pair of terminals;
a second pair of terminals;
connectivity circuitry configured to communicate with a legacy field device connected to the second pair of terminals in accordance with a legacy communication protocol and control the APL PHY circuitry to communicate through the first pair of terminals in accordance with an Ethernet protocol;
wherein the connectivity circuitry is configured to receive, translate and/or forward writes and configuration changes to a connected legacy field device and communicate acknowledgements from the connected legacy field device to an external device via the APL PHY circuitry; and wherein the connectivity circuitry is configured to provide both analog communications using a 4-20 mA control loop and HART® communications through the second pair of terminals with a connected legacy field device.

26. A system for enabling functional interconnection of a 2-wire Advanced Physical Layer (APL) spur to at least one industrial process legacy field device, the system comprising:

at least one industrial process legacy field device; and an adapter comprising:
a first pair of terminals configured for connection to the 2-wire APL spur;
APL physical layer (PHY) circuitry capacitively coupled to the first pair of terminals;
a second pair of terminals;
connectivity circuitry configured to control the APL PHY circuitry to communicate through the first pair of terminals in accordance with an Ethernet protocol, and communicate with the at least one legacy field device in accordance with a non-Ethernet legacy communication protocol through the second pair of terminals;

wherein the connectivity circuitry is configured to communicate data received through the first pair of terminals by the APL PHY circuitry through the second pair of terminals in accordance with the legacy communication protocol;

wherein the connectivity circuitry is configured to provide both analog communications using a 4-20 mA control loop and digital communications through the second pair of terminals with the connected at least one legacy field device.

27. The system of claim 26, wherein the adapter is configured to trigger a notification or an alarm when a value indicated by the 4-20 mA control loop differs from a value indicated by a digital communication through the second pair of terminals by a threshold amount.

\* \* \* \* \*